(12) United States Patent
Quadrini, Jr. et al.

(10) Patent No.: US 11,318,396 B1
(45) Date of Patent: May 3, 2022

(54) SYSTEM OF WATER SUPPLY, DESALINATION AND MINERAL RETRIEVAL

(71) Applicants: David Quadrini, Jr., Dallas, TX (US); David Quadrini, Sr., Dallas, TX (US)

(72) Inventors: David Quadrini, Jr., Dallas, TX (US); David Quadrini, Sr., Dallas, TX (US)

(*) Notice: Subject to any disclaimer, the term of this patent is extended or adjusted under 35 U.S.C. 154(b) by 0 days.

(21) Appl. No.: 17/495,793

(22) Filed: Oct. 6, 2021

(51) Int. Cl.
| | | |
|---|---|---|
| *B01D 1/24* | (2006.01) | |
| *B01D 1/00* | (2006.01) | |
| *B01D 3/06* | (2006.01) | |
| *C02F 1/08* | (2006.01) | |
| *C02F 1/14* | (2006.01) | |
| *F24S 10/30* | (2018.01) | |
| *C02F 1/06* | (2006.01) | |

(52) U.S. Cl.
CPC ............. *B01D 1/24* (2013.01); *B01D 1/0035* (2013.01); *B01D 3/06* (2013.01); *C02F 1/06* (2013.01); *C02F 1/08* (2013.01); *C02F 1/14* (2013.01); *F24S 10/30* (2018.05); *C02F 2201/009* (2013.01)

(58) Field of Classification Search
CPC .......... B01D 1/0035; B01D 1/24; B01D 3/06; C02F 1/06; C02F 1/08; C02F 1/14; C02F 2201/009; F24S 10/30
See application file for complete search history.

(56) References Cited

U.S. PATENT DOCUMENTS

| | | | |
|---|---|---|---|
| 9,623,344 B2* | 4/2017 | Bosch I Bosch | .... B01D 1/0035 |
| 9,938,162 B2* | 4/2018 | Reda ........................ | B01D 3/10 |
| 9,988,284 B2* | 6/2018 | Reda ........................ | C02F 1/06 |
| 10,233,095 B1* | 3/2019 | Haidar ................. | B01D 1/0035 |
| 11,186,497 B2* | 11/2021 | Wang ........................ | B01D 1/22 |
| 2005/0067352 A1* | 3/2005 | Kontos ................ | B01D 5/0066 |
| | | | 210/642 |
| 2015/0353385 A1* | 12/2015 | Wang .................. | B01D 61/362 |
| | | | 427/244 |
| 2016/0251237 A1* | 9/2016 | Reda ......................... | C02F 1/06 |
| | | | 203/11 |

\* cited by examiner

*Primary Examiner* — Jonathan Miller
(74) *Attorney, Agent, or Firm* — Jeffrey Roddy

(57) ABSTRACT

A system of water supply, desalination and mineral salt retrieval includes a solar concentrating tower, the tower includes a pressure vessel that includes a layer of woven or non-woven carbon-nanotubes defining a thermal interface and providing a super heated surface for spray application of seawater or brine.

3 Claims, 5 Drawing Sheets

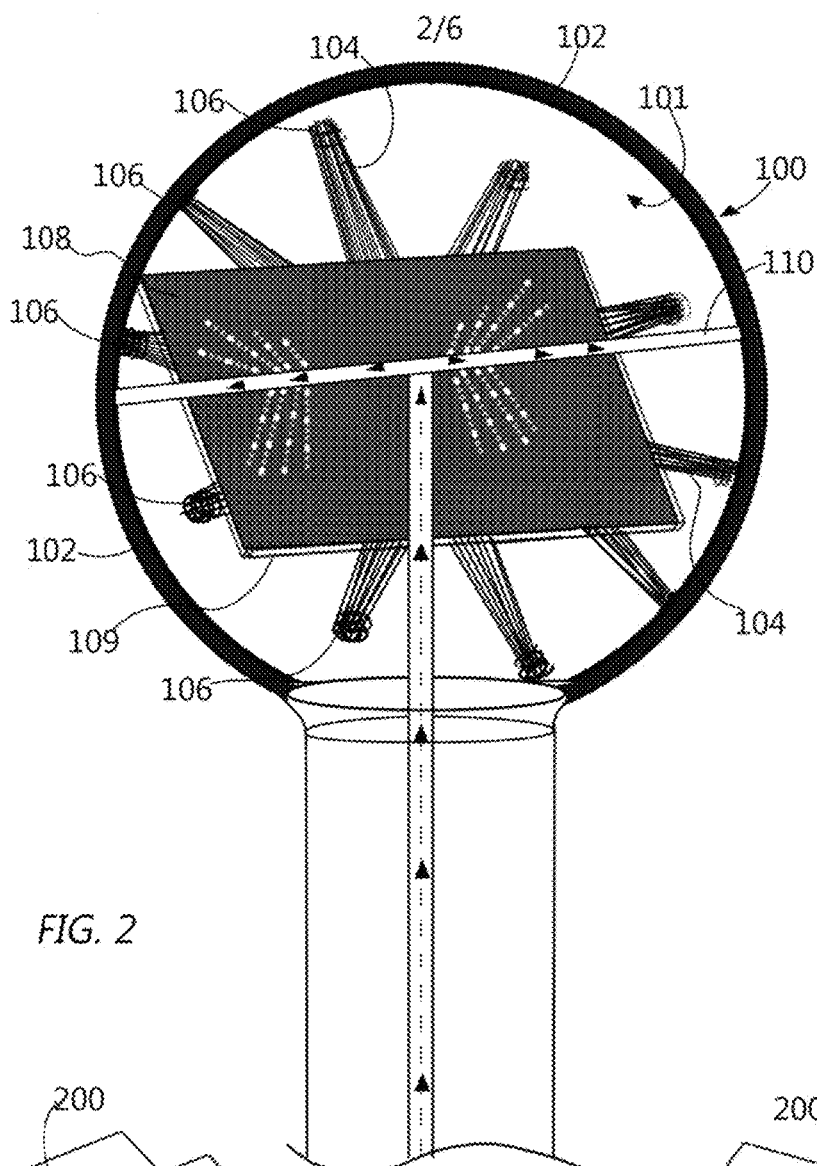
FIG. 2
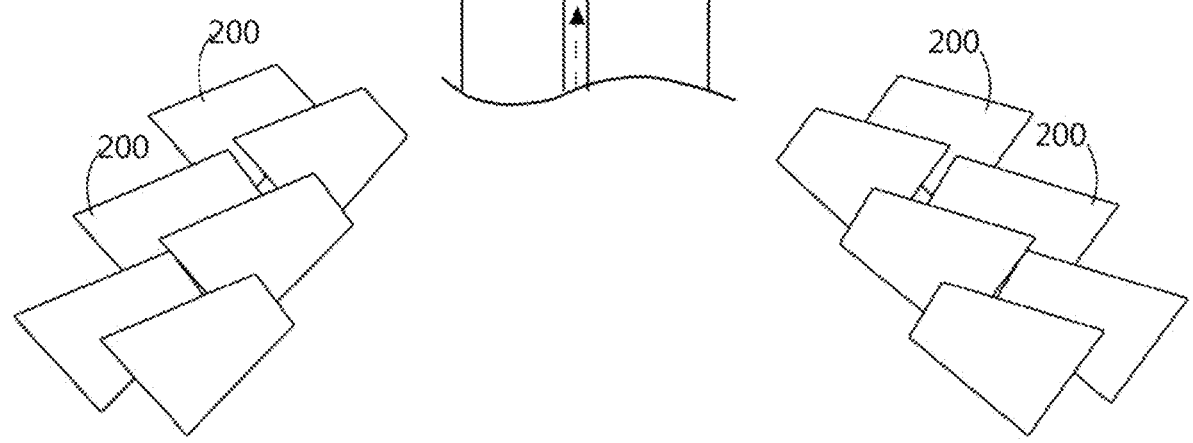

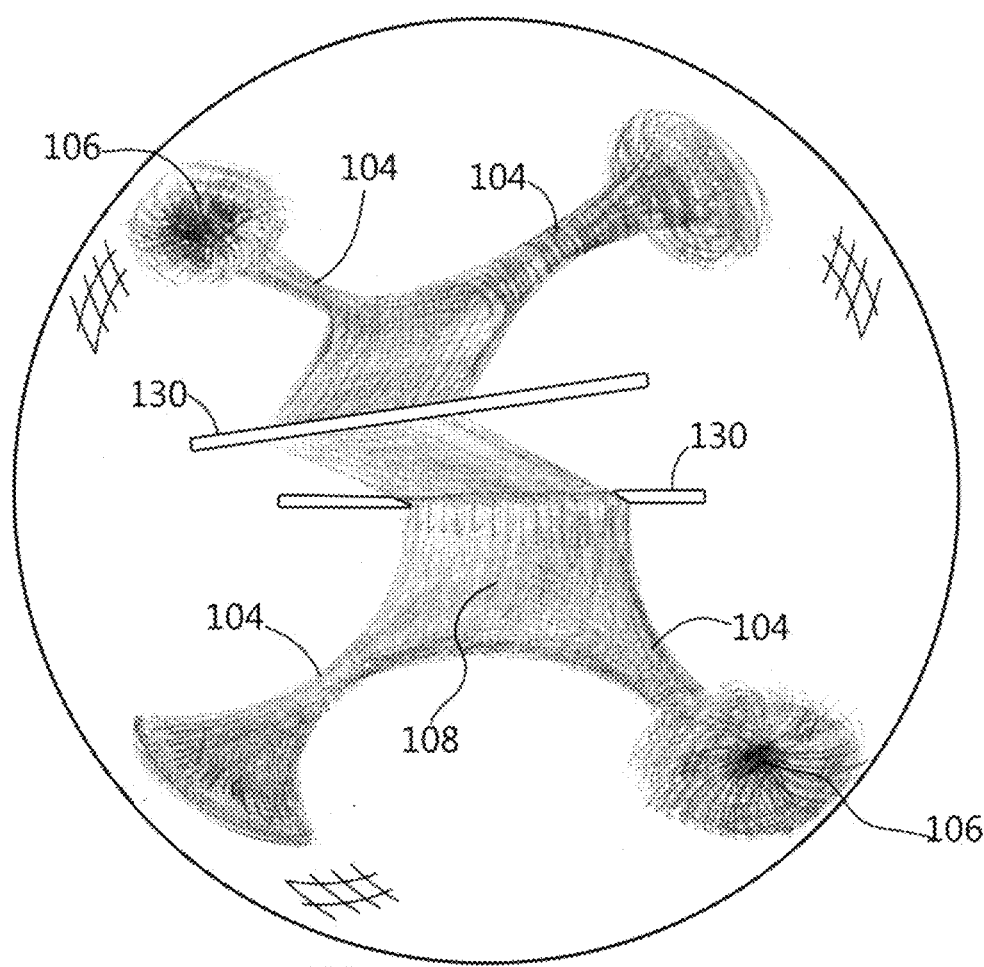
FIG. 4
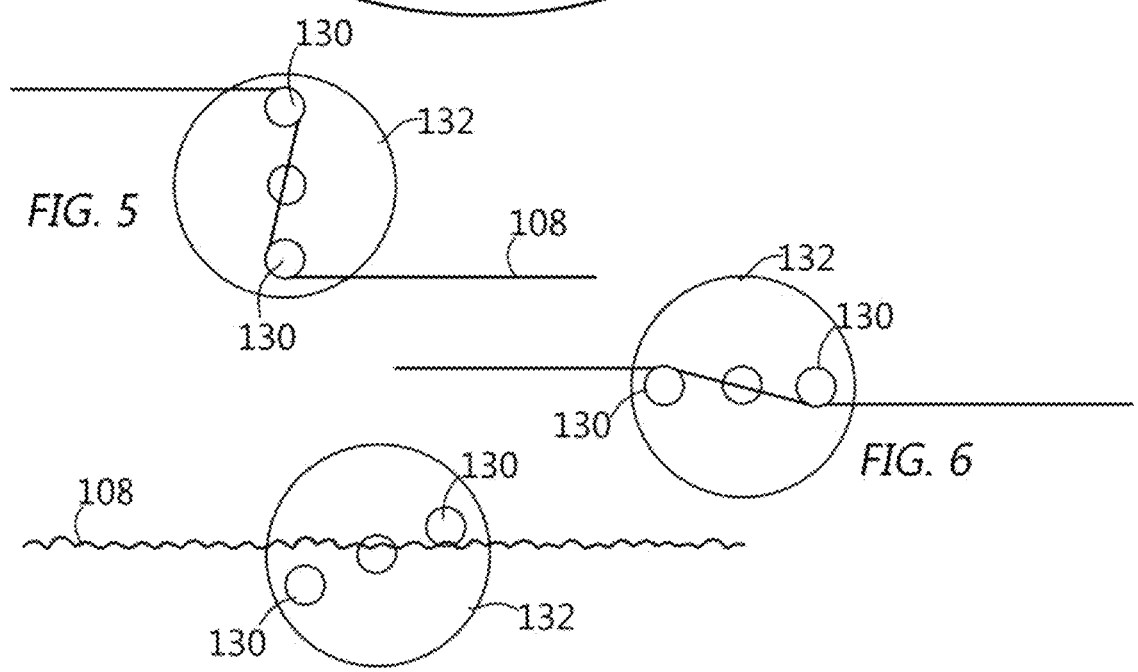
FIG. 5
FIG. 6
FIG. 7

SYSTEM OF WATER SUPPLY, DESALINATION AND MINERAL RETRIEVAL

FIELD OF THE INVENTION

The present invention relates generally to systems and methods for desalination.

BACKGROUND OF THE INVENTION

Parts of the western and Southwestern United States are frequently encountering periods of drought that are endangering the health and well-being of its citizens and the agricultural economy. Conventional desalination schemes are extremely energy intensive requiring pumps, and multiple stages. Methodologies include steam distillation, reverse osmosis and metal-organic frameworks.

Thermal Properties of Carbon-nanotube Materials (CNTs) Carbon-nanotubes exhibit superior thermal conductivity when compared to all conventional materials; e.g., 1400 $Wm^{-1}K^{-1}$ to 3000 $Wm^{-1}K^{-1}$ for multi-walled CNTs, and higher values (~2800-6000 $Wm^{-1}K^{-1}$) for single walled CNTs. Recently, CNTs through painstaking processes have been successfully "spun" into CNT threads and woven CNT fabric is envisioned. Non-woven forms have been made by chemical vapor deposition, and vertically aligned "VACNT forests" move ever closer to a theoretical perfect black body. Planar forms of CNTs have been previously described in the art as having a siliceous or epoxy matrix. Other forms of woven CNTs may be substantially pure CNTs. While thermal and electrical conductivity varies by form, CNTs of whatever form promise superior thermal conduction when compared to any other material and show great promise as thermal interfaces; eg., heat sink applications and solar boilers.

It would be desirable to provide a complete life-cycle for desalination that includes mineralized water procurement, e.g., seawater or brine, passive desalination and low energy retrieval of valuable mineral salts such as lithium.

It would be further desirable if the seawater or brine was of sufficient volume to serve as injection fluid to aid in the retrieval of sub-surface mineral salts.

It would further desirable if the system included a first stage of flash distillation to separate seawater or brine from a collection of mineral salts.

SUMMARY OF THE INVENTION

In a general exemplary implementation according to the present disclosure, a system for providing potable water, desalination and mineral salt retrieval includes a reservoir to store a volume of the mineralized water, one or more elevated pressure vessels, the pressure vessels include at least a layer of made from woven carbon nanotubes, non-woven carbon nanotubes, or vertically aligned carbon-nanotubes, and, the pressure vessels include elements adapted to vaporize fluids, and release vaporized fluids under pressure.

In an aspect combinable with any other aspect herein, the pressure vessel may include one or more apertures through which fibrous portions of an external woven nor non-woven covering extend interiorly.

In an aspect combinable with any other aspect herein, portions of the external woven or non-woven covering inside the pressure vessel transition into a panel that is flexible.

In an aspect combinable with any other aspect herein, apertures thorough which portions of the external woven or non-woven covering extend are sealed around the extended fibrous portions forming a pressure resistant seal.

In an aspect combinable with any other aspect herein, the extended fibrous portions are combined into a pair of woven or non-woven surfaces connected about a shared border.

In an aspect combinable with any other aspect herein, the woven or non-woven panel is flexible such that it may assume a taut or loose state.

In an aspect combinable with any other aspect herein, the woven or non-woven panel is periodically or reciprocally movable from a taut state to a loose state.

In an aspect combinable with any other aspect herein, the woven panel may include a plurality of raised or indented regions, troughs or pits.

In an aspect combinable with any other aspect herein, the woven or non-woven panel may be formed from funnel shaped woven or non-woven structures extending through the apertures.

In an aspect combinable with any other aspect herein, the woven or non-woven panel may be flexible or stretchable.

In an aspect combinable with any other aspect herein, pits, recesses or troughs if any are present in the woven or non-woven panel, may be minimized and made more shallow or brought into co-planar agreement with other portions of the panel by tensioning, folding or stretching the material of the panel into a taut state.

In an aspect combinable with any other aspect herein, heat via solar concentrating reflectors is thermally conducted from exterior portions of the woven or non-woven covering to the internal woven panel.

In an aspect combinable with any other aspect herein, the pressure vessel may include a fixed or directional lens.

In an aspect combinable with any other aspect herein, the pressure vessel lens or vessel body may be mechanically capable of and programmed to track the sun; e.g., heliostatic.

In an aspect combinable with any other aspect herein, an interior of the pressure vessel may be lined with a fabric of woven or non-woven carbon-nanotube fiber.

In an aspect combinable with any other aspect herein, the pressure vessel may be interiorly or exteriorly lined with a tiling of heat resistant ceramics.

In an aspect combinable with any other aspect herein, the pressure vessel is constructed and sealed to operate at least at 14 Bar.

In an aspect combinable with any other aspect herein, mineralized water such as seawater or brine may be transported, e.g., via aqueduct from coastal regions such as the Gulf of California transported to a low altitude region such as the Salton Sea and surroundings, whereupon it is stored in elevated tanks until introduced into the one or more pressure vessels.

In an aspect combinable with any other aspect herein, mineral rich brine may be obtained by sub-surface injection of native seawater into geothermally active regions such as the Salton Sea and surroundings, forcing lithium rich brine to the surface for processing.

In an aspect combinable with any other aspect herein, a normally closed pressure valve for shunting steam or high pressure vapor to a steam turbine is intermittently opened when pressure within the vessels is sufficient.

In an aspect combinable with any other aspect herein, a flexible woven or non-woven panel of carbon-nanotube fibers may be intermittently flexed, folded or stretched to mechanically separate solidified deposits of dried or drying mineral salts adhering to the woven panel.

In an aspect combinable with any other aspect herein, stretcher bars laid across or connected to the woven or non-woven panel may maintain the woven or non-woven panel in a taut state and enable the programmatic mechanical manipulation of the woven or non-woven panel to loosen mineral salt deposits.

In an aspect combinable with any other aspect herein, stretcher bars laid across or connected to the woven or non-woven panel may vibrate the woven or non-woven panel to loosen mineral desposits.

In an aspect combinable with any other aspect herein, loosened mineral salt deposits may be collected in a bin that is environmentally separated/sealed from the pressure vessel.

BRIEF DESCRIPTION OF DRAWINGS

FIG. 2 is another generalized diagrammatic view thereof;

FIG. 4 in a diagrammatic view, depicts one possible configuration of an internal woven panel contiguous and interwoven with extended portions of an exterior carbon-nanotube fiber cover that extend through atmospherically sealed apertures in the pressure vessel.

FIGS. 5-7 in diagrammatic side views, depict a transition of the internal woven panel from a taut state to a loose state with the mechanical movement of stretcher bars.

DETAILED DESCRIPTION OF THE INVENTION

In the following detailed description, the singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. It should be understood that the objects, features and aspects of any implementation/embodiment disclosed herein may be combined with any object, feature or aspect of any other implementation/embodiment without departing from the scope of the invention. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Figure 1:
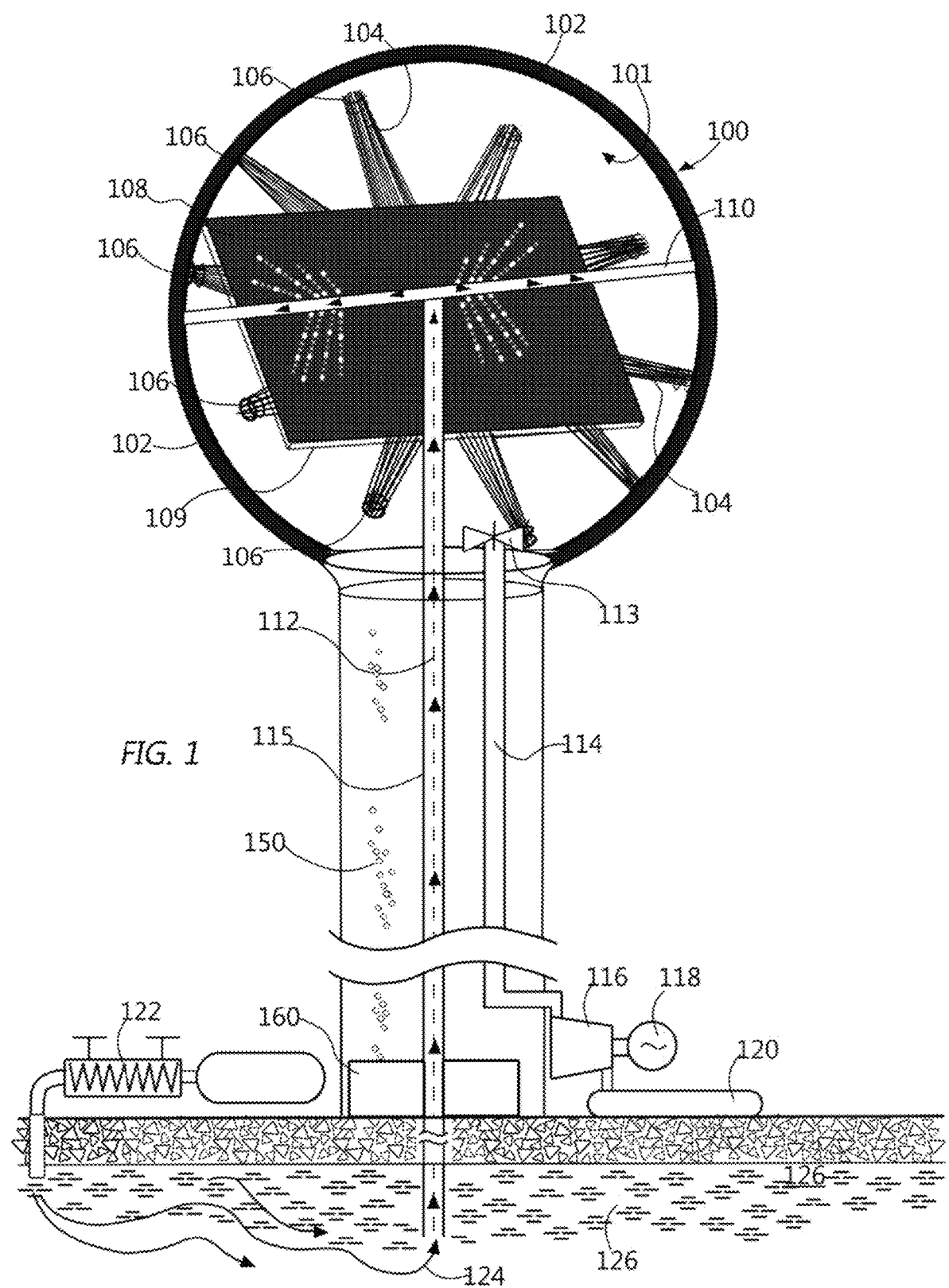
FIG. 1 is a generalized diagrammatic view of a desalination tower according to implementations described herein of water desalination method and mineral salt retrieval system.

In a first example implementation according to the system of the present invention, FIG. 1 shows a diagrammatic figure that includes a tower (100) with a pressure vessel (101) that is typically spherical and resides atop the tower, a wrap or covering (102) of woven or non-woven carbon-nanotube fiber that surrounds the exterior of the pressure vessel which serves as an support armature for the cover. Apertures (106) in the pressure vessel (101) permit fibrous extensions (104) of the cover (102) to extend into the interior of the pressure vessel, and, the fibrous extensions are interwoven to form interior panel (108) also of woven or non-woven carbon-nanotube fiber. Spaces between the aperture sides and the fibrous extensions are sealed with high temperature and pressure resistant material; e.g., o-rings, high-temp silicone sealant. Fibrous extensions may be woven, non-woven material, individual threads or woven funnel-like structures that extend from the exterior woven or non-woven covering through the apertures and which are then formed/woven into the panel. The woven or non-woven panel (108) may be flexible and any suitable shape, mass, width or length, being limited only to the interior volume of the pressure vessel. The surface of the panel may include ridges, indentations, pits or lacunae. Fluid intake means; the fluid being a subsurface obtained brine or seawater, may include brine intake piping (112) and a means of applying fluids to the panel, e.g., spray bar (110) with nozzles (not shown) that are adapted to spray brine (124) on the panel when the panel is sufficiently heated, e.g., >400 C. In the first example implementation, sunlight may be reflected by mirrored reflectors (200) in an arrangement similar to that of a solar concentrating tower to the exterior covering (102) of the pressure vessel (101); the woven or non-woven carbon-nanotube fiber covering serving to efficiently absorb the heat energy which is transferred by conduction through the metal of the pressure vessel itself and also via fibrous extensions (104) passing through apertures (106) and to the woven panel (108). Due to the thermal conductivity of the exterior cover, both the interior woven or non-woven panel and the interior surfaces of the pressure vessel are theoretically capable of reaching temperatures in excess of the deformation temperature of 304 stainless steel. Once sufficient temperatures are reached, brine is cyclically sprayed onto the interior panel and instantly vaporized similar in principle to a monotube boiler. In another example implementation, a woven or non-woven carbon-nanotube covering may substantially line the inside of the pressure vessel as a compliment to the suspended woven or non-woven panel or as a substitute. In some implementations, the pressure vessel may include a lens, and the pressure vessel (101) may be mechanically capable and automated/programmed to track the sun so as to maximize the amount of photons entering the vessel via the lens. In such a case, the photons directly impact the interior lining and thermally transfer heat energy to other interior elements as contrasted with the thermal transfer via an exterior cover to the interior panel or lining. Additionally, in (FIG. 1) a steam intake pipe (114) and valve (113) may be automated to draw off super heated steam which then is shunted to a steam turbine (116) and finally a condenser (120), which produces potable water. In some implementations, the brine (112) intake piping (115) retrieves subsurface brine which has been displaced by seawater injection into the subsurface layer (126) by pumping (122) in seawater.

FIG. 2 is a generalized view showing a tower (100) with pressure chamber (101) and a plurality of arrayed solar reflecting mirrors that are typically heliostatic configured to track the sun and reflect sunlight onto the exterior of the pressure vessel. This arrangement is typical of many solar concentrating towers.

Figure 3:
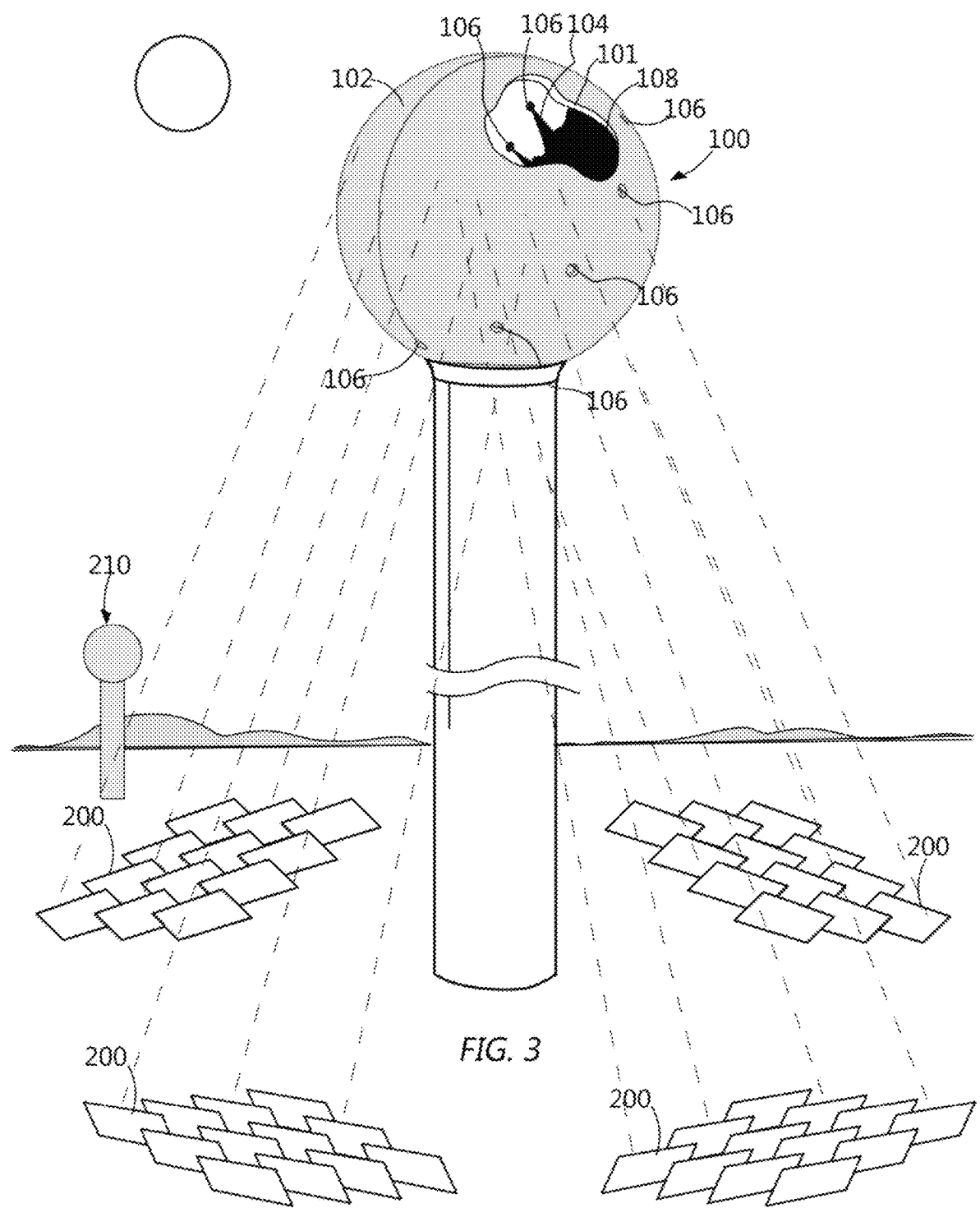
FIG. 3 is a diagrammatic view showing a tower with pressure vessel at a distance with solar concentrating reflectors.

FIG. 3 shows a tower (100) from a distance with a cut away section of the pressure vessel revealing the interior panel (108), apertures (106), woven or non-woven fibrous extensions (104) wherein multiple arrays of solar reflecting mirrors (200) at the base of the tower are typically configured to track the sun and reflect sunlight onto the exterior of the pressure vessel. An elevated water tower/reservoir (210) adjacent tower (100) may be filled with brine or seawater (124) and introduced directly into the pressure vessel (101) or injected first into a subsurface region and then pumped into the pressure vessel for spray application.

FIG. 4 shows one example interior of a pressure vessel (101) with a woven or non-woven panel (108) shown in a taut state being so tensioned by stretcher bars (130). Funnel shaped or non-woven woven fibrous portions (104) contiguously interwoven, merged or connected with the panel (108) and defining a thermal transfer means from the exterior of the vessel to the interior.

FIGS. 5-7 show flexible panel (108) transitioning from a taut state to a relatively untensioned state with the mechanically actuated (132) stretcher bars (130) flexing the panel (108). In some implementations, the panel (108) may be naturally bunching; exhibiting troughs and ridges, due to the particular woven or non-woven structure, and flatten out when stretched or tensionably folded by stretcher bars (130). In such case, mineralized salts may be dislodged by shearing and breaking surface bonding. Mechanical actuator (132) to which stretcher bars (130) are attached may attached to the interior surfaces of the pressure vessel and be cyclically timed to actuate; e.g., rotate or vibrate, or actuated based on the real-time sensed accumulated mass of mineral deposits adhering to the woven or non-woven structures.

Figure 8:
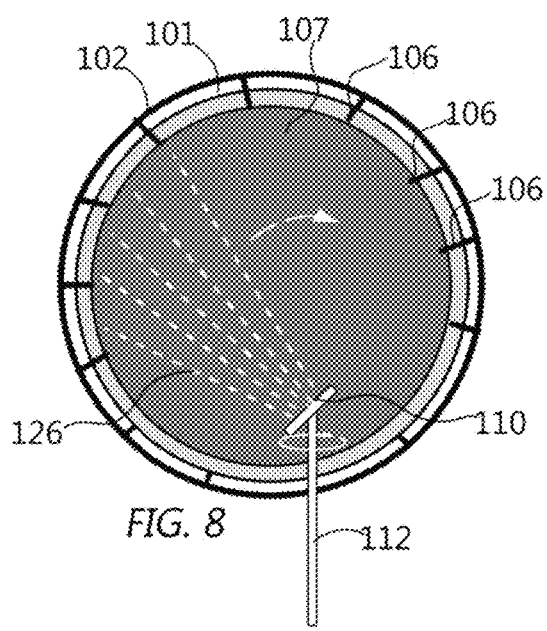
FIG. 8 is a cross-sectional view of an example pressure vessel.

FIG. 8 is a cross-sectional view of an example pressure vessel showing an exterior cover or layer (102) of woven or non-woven carbon-nanotubes, a wall of pressure vessel (101), apertures (106) through which portions of the external layer protrude into the interior of the pressure vessel, and, an lining (107) of woven or non-woven carbon-nanotubes in the interior surfaces of the pressure vessel, the exterior cover serving to transfer heat energy to the interior lining via woven or non-woven fibrous material (104) of carbon-nanotubes that form a contiguous bridging thermal interface, interwoven or connected with both the external and internal thermal interface material.

Figure 9:
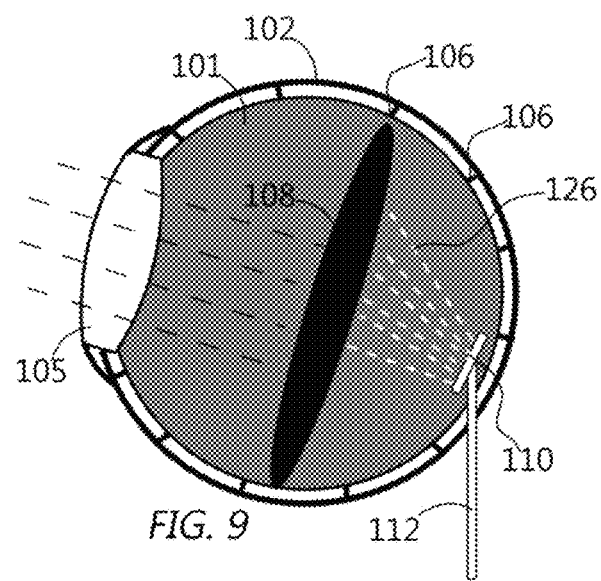
FIG. 9 is a cross-sectional view of another example pressure vessel including a lens.

FIG. 9 is a cross-sectional view of another example implementation including a lens (105) and an internal woven or non-woven panel (108) that may be suspended, stretched or mounted transversely within the generally spherical interior of the pressure vessel (101). Lens (105) may be configured to track the sun via a movable circumjacent section (133) (FIG. 11) and concentrate sun rays onto panel (108) where the panel is super heated; e.g., >400 C to serve as a super heated vaporization surface for mineralized fluids, especially seawater or brine (126). Brine salts are deposited on the panel after one or more cycles of vaporization and removed by agitating, folding or otherwise deforming the panel. Brine salts may also be deposited on the walls of the pressure vessel and detached therefrom by flexing the lining of the vessel which may be accomplished by mechanical push rods (not shown) that are disposed between the lining and the interior surface of the vessel and can be actuated to deform the lining sufficiently to break adhesions of salt deposits. Mineral salts thus loosened may be collected (160) at a base of tower (100). While the internal lining may be woven or non-woven carbon-nanotubes, it may also be textured silicone, where irregularities on the silicone surface trap mineral salts.

Figure 10:
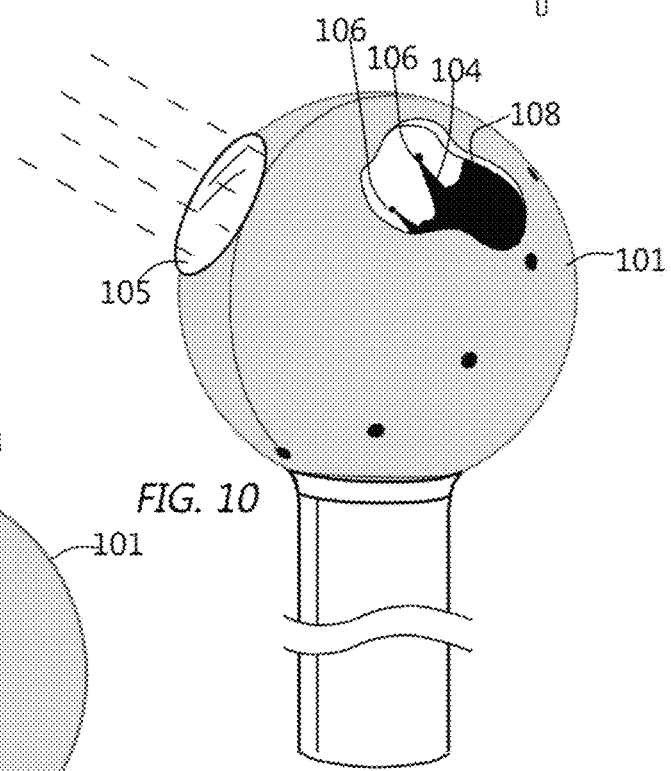
FIG. 10 shows a tower (100) with a pressure vessel (101) that includes a lens (105), the lens is configured to track the sun.

FIG. 10 is a partial view of a pressure vessel with a lens (105) that is capable of tracking the sun by heliostatic means, including two-axis motorized systems where the reflecting surface is in an alt-azimuth arrangement.

Figure 11:
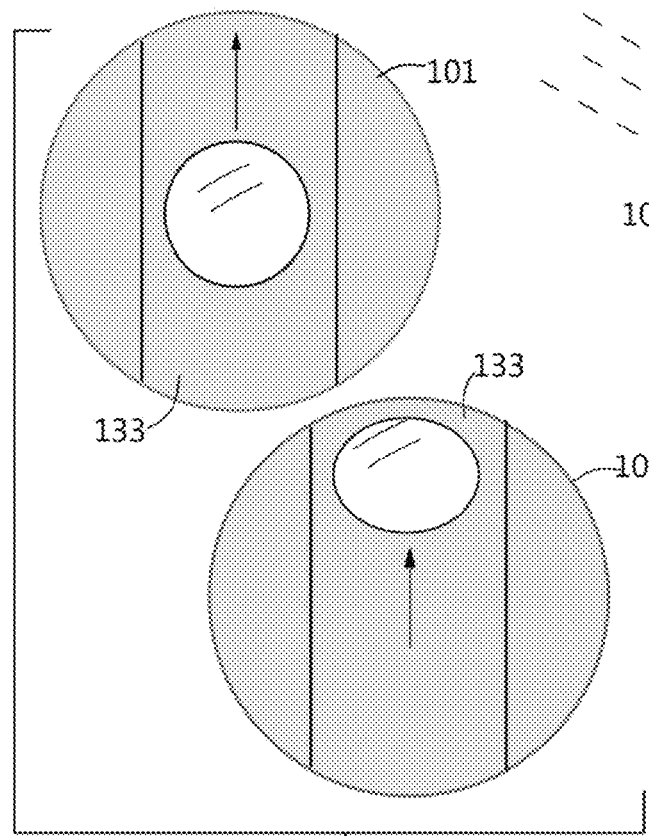
FIG. 11 shows a pressure vessel (101) configured to track the sun.

FIG. 11 is a diagrammatic view showing a transition in position from a lower to higher position of lens (105) which is directly mounted to circumjacent section (133) which is movable by programmatic mechanical means using servo motors, rack and pinion and/or planetary gearing, etc., that are well known and typically used for astronomical observatories and the like. Accordingly, any suitable means that would be appreciated by those having skill in the art of moving the lens and thereby tracking the sun may be used. It is also possible that the pressure vessel as a whole may rotate atop the tower.

Ramifications

The Salton Sea and its surroundings are geothermically active and known to harbor significant quantities of lithium salts. Salinity of the Salton Sea is about 44K mg/L. Average salinity of the worlds oceans averages 35K mg/L. Accordingly, seawater might be channeled to the Salton Sea from either the California coast or better yet, the Sea of Cortez which is at sea level and lacks mountainous obstructions, making simple gravity fed aqueducting means of vast quantities of water possible. In any event, seawater could be channeled to the Salton region, stored in elevated reservoirs or tanks and utilized for sub-surface injection under or adjacent to the Salton Sea. Some projects for lithium extraction advocate a so-called closed-loop direct lithium extraction that involves pulling superheated brine from deep beneath the lake and using steam to run turbines. Lithium salts are extracted from the brine in a two stage process as lithium chloride and lithium hydroxide. However, the heat generated by geothermal processes alone is still below that produced by solar concentrating type technologies and the steam output from geothermal alone will produce as much power, and, geothermal extraction means alone does not solve the water replenishment in which seawater is used both to replenish the Salton Sea ensuring a sufficient volume of water such that erosion and dust storms of corrosive and toxic elements are mitigated.

It should be understood that the drawings and detailed description herein are to be regarded in an illustrative rather than a restrictive manner, and are not intended to be limiting to the particular implementations, forms and examples disclosed. For example, while in the particular examples given seawater or brine application is described as spraying, it is also possible that fluids may be poured over heated internal regions of the pressure vessel and thereby cyclically converted to steam and directed to a steam turbine. Panel contact temperature may be monitored and used to time the cyclic application of brine to the panel or other thermal interface surfaces in the interior of the pressure vessel. Accordingly, it is intended that this disclosure encompass any further modifications, changes, rearrangements, substitutions, alternatives, design choices, and implementations as would be appreciated by those of ordinary skill in the art having benefit of this disclosure, and falling within the spirit and scope of the following claims.

What is claimed is:
1. A method for water desalination, mineral recovery and power production comprising the steps of:
providing a coastal or inland body of saltwater or mineralized fluid;

providing one or more towers, the one or more towers comprising a pressure vessel that has an exterior covering including woven or non-woven nanotubes defining a highly thermally absorbent and efficient thermal material, the highly thermally absorbent and efficient thermal material includes thermal transfer portions that pass through one or more apertures in the pressure vessel, the one or more apertures include a pressure seal between the one or more apertures and the thermal transfer portions, the thermal transfer portions forming a super-heatable surface in an interior of the pressure vessel;

pumping the saltwater or mineralized fluid into the pressure vessel and spraying the saltwater or mineralized fluid over the super-heatable surface to vaporize a water constituent from the salt water or mineralized fluid;

condensing the water constituent to product potable water;

periodically deforming the super-heatable surface to separate residual mineral deposits from the super-heatable surface.

2. The method according to claim 1 further comprising the step of collecting the residual mineral deposits.

3. The method according to claim 1 further comprising the step of shunting a portion of the vaporized water constituent to a steam turbine.

\* \* \* \* \*